(12) United States Patent
Nakamura et al.

(10) Patent No.: US 11,591,110 B2
(45) Date of Patent: Feb. 28, 2023

(54) AERIAL VEHICLE SAFETY APPARATUS AND AERIAL VEHICLE

(71) Applicant: NIPPON KAYAKU KABUSHIKI KAISHA, Chiyoda-ku (JP)

(72) Inventors: Hiroshi Nakamura, Himeji (JP); Yasuhiko Yagihashi, Himeji (JP); Koichi Sasamoto, Himeji (JP); Takahiro Ooi, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 260 days.

(21) Appl. No.: 16/758,702

(22) PCT Filed: Jun. 19, 2018

(86) PCT No.: PCT/JP2018/023362
§ 371 (c)(1),
(2) Date: Apr. 23, 2020

(87) PCT Pub. No.: WO2019/092914
PCT Pub. Date: May 16, 2019

(65) Prior Publication Data
US 2020/0339278 A1    Oct. 29, 2020

(30) Foreign Application Priority Data

Nov. 10, 2017    (JP) ............................. JP2017-217784

(51) Int. Cl.
*B64D 45/04*        (2006.01)
*B64D 17/72*        (2006.01)
(Continued)

(52) U.S. Cl.
CPC ............. *B64D 45/04* (2013.01); *B64D 17/72* (2013.01); *B64D 17/80* (2013.01); *B64C 39/024* (2013.01); *B64C 2201/185* (2013.01)

(58) Field of Classification Search
CPC ...... B64D 17/72; B64D 17/725; B64D 17/80; B64D 17/62; B64D 17/54; B64D 45/04; B64C 2201/185
See application file for complete search history.

(56) References Cited

U.S. PATENT DOCUMENTS 4,050,657 A * 9/1977 Murphy ................. B64D 17/80
                                                        244/147
9,834,311 B2    12/2017 Sugaya
(Continued)

FOREIGN PATENT DOCUMENTS

CN          205819574 U      12/2016
CN          106697300 A *    5/2017 ............. B64D 17/62
(Continued)

OTHER PUBLICATIONS

International Search Report dated Aug. 7, 2018 in PCT/JP2018/023362 filed on Jun. 19, 2018, 2 pages.
(Continued)

*Primary Examiner* — Joshua J Michener
*Assistant Examiner* — Arfan Y. Sinaki
(74) *Attorney, Agent, or Firm* — Oblon, McClelland, Maier & Neustadt, L.L.P.

(57) ABSTRACT

An aerial vehicle safety apparatus includes an expandable object and an ejection apparatus. The ejection apparatus includes a container that accommodates the expandable object and has an opening provided on one end side, a moving member provided in the container, the moving member including an emission base carrying the expandable object on a side of the opening, the moving member being movable along an inner wall of the container, and a driver that ejects the expandable object by moving the moving member toward the opening. A space located opposite to the opening when viewed from the emission base and surrounded by the container and the moving member commu-
(Continued)

nicates with a space located outside the space through a communication portion.

7 Claims, 8 Drawing Sheets

(51) Int. Cl.
    *B64D 17/80*     (2006.01)
    *B64C 39/02*     (2006.01)

(56) References Cited

U.S. PATENT DOCUMENTS

| | | | |
|---|---|---|---|
| 10,583,929 B2 | 3/2020 | Ozaki | |
| 2016/0221681 A1* | 8/2016 | Babovka | B64D 17/80 |
| 2016/0332738 A1* | 11/2016 | Hiisilä | F41A 19/58 |
| 2017/0152051 A1 | 6/2017 | Sugaya | |
| 2017/0313433 A1 | 11/2017 | Ozaki | |

FOREIGN PATENT DOCUMENTS

| | | | | |
|---|---|---|---|---|
| CN | 106697300 A | | 5/2017 | |
| CN | 106828939 A | | 6/2017 | |
| CN | 107054666 A | * | 8/2017 | ............. B64D 17/80 |
| CN | 107933933 A | * | 4/2018 | ............. B64D 17/54 |
| EP | 3 050 805 A1 | | 8/2016 | |
| EP | 3 206 950 A1 | | 8/2017 | |
| FR | 3 038 884 A1 | | 1/2017 | |
| FR | 3038884 A1 | * | 1/2017 | |
| JP | 63-86595 U | | 6/1988 | |
| JP | 3-118196 U | | 12/1991 | |
| JP | 5-75096 U | | 10/1993 | |
| JP | 10-203491 A | | 8/1998 | |
| JP | 3199573 U | | 9/2015 | |
| JP | 2016-88111 A | | 5/2016 | |
| JP | 2017-95010 A | | 6/2017 | |
| TW | M544472 U | | 7/2017 | |
| WO | WO 2016/059286 A1 | | 4/2016 | |
| WO | WO 2016/171120 A1 | | 10/2016 | |

OTHER PUBLICATIONS

Extended European Search Report dated Jun. 24, 2021 in European Patent Application No. 18876731.3, 10 pages.
Chinese Office Action issued in Chinese Patent Application No. 201880072394.8 dated Nov. 23, 2022, (w/ English Translation).

* cited by examiner

AERIAL VEHICLE SAFETY APPARATUS AND AERIAL VEHICLE

TECHNICAL FIELD

The present invention relates to an aerial vehicle as represented, for example, by a drone and an aerial vehicle safety apparatus attached to the aerial vehicle.

BACKGROUND ART

Various aerial vehicles have conventionally been known. The aerial vehicle includes not only a manned aircraft such as a passenger aircraft or a helicopter but also an unmanned aircraft. In particular, with recent development of an autonomous control technology and a flight control technology, industrial applications of an unmanned aircraft such as a drone have increasingly been expanded.

A drone includes, for example, a plurality of rotors, and flies by rotating the plurality of rotors simultaneously in a balanced manner. At that time, ascent and descent are done by uniformly increasing or decreasing the number of rotations of the plurality of rotors, and movement forward and rearward is done by inclining an airframe by individually increasing or decreasing the number of rotations of each of the plurality of rotors. It is expected that such an unmanned aircraft will more increasingly be used worldwide in the future.

A falling accident of an unmanned aircraft, however, has been feared, which has interfered widespread use of the unmanned aircraft. In order to lower the possibility of such a falling accident, a parachute apparatus for an unmanned aircraft that serves as a safety apparatus has been put into practical use. Such a parachute apparatus for an unmanned aircraft lessens impact at the time of landing by lowering a speed of the unmanned aircraft by using an expanded parachute in the event of falling of the unmanned aircraft.

For example, EP No. 3050805 discloses an aerial vehicle safety apparatus that expands a parachute by operating a piston in a cylinder with thrust force of gunpowders contained in a gas generator and ejecting the parachute through an opening to the outside as a result of operation of the piston.

CITATION LIST

Patent Literature

PTL 1: EP No. 3050805

SUMMARY OF INVENTION

Technical Problem

In the aerial vehicle safety apparatus disclosed in PTL 1, however, with movement of the piston in the cylinder as a result of burning of gunpowders contained in the gas generator, a negative pressure is generated in a space inside the piston in the cylinder and it disadvantageously cancels at least some of thrust force for moving the piston. If sufficient thrust force cannot be obtained due to generation of the negative pressure, ejection of the parachute to the outside will be insufficient and expansion of the parachute may become difficult.

This problem occurs similarly also when a paraglider or an air bag instead of the parachute is provided in an aerial vehicle in an ejectable manner.

The present invention was made to solve the problems described above, and an object thereof is to provide an aerial vehicle safety apparatus capable of reliably ejecting an expandable object and an aerial vehicle including the same.

Solution to Problem

An aerial vehicle safety apparatus based on the present invention is attachable to an aerial vehicle, and the aerial vehicle safety apparatus includes an expandable object, an ejection apparatus, and a coupling member. The expandable object can be expanded as being ejected into air. The ejection apparatus ejects the expandable object into air. The coupling member has one end coupled to the expandable object and the other end coupled to the ejection apparatus or the aerial vehicle. The ejection apparatus includes a container accommodating the expandable object and having an opening provided on a one end side, a moving member provided in the container, the moving member including an emission base carrying the expandable object on a side of the opening, the moving member being movable along an inner wall of the container, and a driver that ejects the expandable object by moving the moving member toward the opening. In the aerial vehicle safety apparatus based on the present invention, the ejection apparatus is provided with a communication portion that allows communication between a space located opposite to the opening when viewed from the emission base and surrounded by the container and the moving member and a space located outside the space.

In the aerial vehicle safety apparatus based on the present invention, preferably, the communication portion is defined by a hole provided in at least any of the container and the emission base or a gap provided between the container and the emission base.

In the aerial vehicle safety apparatus based on the present invention, the ejection apparatus may further include a stopper that prevents the emission base from moving before the driver is activated.

In the aerial vehicle safety apparatus based on the present invention, the stopper may include a protrusion provided on the inner wall of the container.

In the aerial vehicle safety apparatus based on the present invention, the stopper may include a string member that connects the inner wall of the container and the emission base to each other, and in that case, the string member is preferably cut as the driver drives the moving member.

In the aerial vehicle safety apparatus based on the present invention, the ejection apparatus may further include a guide that guides movement of the moving member along the inner wall of the container, and in that case, the guide preferably includes a portion like a protrusion provided to protrude from an outer circumferential portion of the emission base along the inner wall of the container.

In the aerial vehicle safety apparatus based on the present invention, the driver preferably includes a gas generator that discharges gas by being activated in response to input of an electrical signal.

In the aerial vehicle safety apparatus based on the present invention, the gas generator may be of an explosive type containing a propellant that generates combustion gas serving as thrust force that moves the moving member.

In the aerial vehicle safely apparatus based on the present invention, the ejection apparatus may further include a restriction member that restricts a direction of discharge of gas discharged from the gas generator, by being positioned to surround the gas generator. In that case, the restriction member preferably allows discharge of gas to the moving member by matching the direction of discharge of gas to a direction of movement of the moving member toward the opening.

In the aerial vehicle safety apparatus based on the present invention, preferably, the moving member includes a recess defining portion that defines a recess that opens toward the side opposite to the opening, and the gas generator is inserted in the recess defining portion as being arranged in the recess. In that case, a sealing member is preferably provided between the recess defining portion and the gas generator.

In the aerial vehicle safety apparatus based on the present invention, the expandable object preferably includes any one of a parachute, a paraglider, and an air bag.

Among these, many parachutes have a fabric in a shape of an umbrella, and the parachute is connected to an aerial vehicle to be protected through a coupling member (which is generally referred to as a cord or a line) and lowers a speed of the aerial vehicle by using air resistance. Examples of the parachute include a parachute including a single chute, a parachute including a string of chutes identical in shape, and a parachute including a string of chutes different in shape. Examples of the parachute further include a parachute including a chute having a closed center (that is, without a hole) and a parachute including a chute provided with a hole called a spill hole in the center. A specific form of the parachute can be selected as appropriate in consideration of various purposes such as mitigation of impact at the time of expansion of the parachute, adjustment of a rate of descent, or resistance against influence by disturbance such as wind.

A paraglider is in a shape like a wing having an aspect ratio approximately not lower than one, and it is connected to an aerial vehicle to be protected through a coupling member (which is generally referred to as a cord or a line). The paraglider has a steering cord called a brake cord connected to left and right ends of the wing. By pulling the brake cord, various stresses applied to a cross-section of the wing can be varied and consequently, gliding, turning, and rapid deceleration can be done. Therefore, the paraglider can do gliding, turning, and rapid deceleration which cannot be done by a parachute. A Rogallo paraglider and a triangular paraglider are also available as similarly constructed paragliders. In order to maintain the shape of the wing by using ram air, a paraglider with an air intake (an air inlet which will be described later) is in the mainstream, however, there is a paraglider without an air intake. In order to fly in a stable manner, a paraglider with an air intake is more preferably used. From a point of view of reduction in weight, a single surface paraglider (that is, a paraglider without an air intake) is preferably used. Furthermore, a paraglider of a type capable of flying by forcibly obtaining thrust force by separately providing a propulsive apparatus such as a propeller may be used.

An aerial vehicle based on the present invention includes an airframe, a propulsive mechanism that is provided in the airframe and propels the airframe, and the aerial vehicle safety apparatus based on the present invention described above, and the aerial vehicle safety apparatus is attached to the airframe.

Advantageous Effects of Invention

According to the present invention, an aerial vehicle safety apparatus capable of reliably ejecting an expandable object and an aerial vehicle including the same can be provided.

BRIEF DESCRIPTION OF DRAWINGS

FIG. 3 (A) is a schematic cross-sectional view along the line A-A of the aerial vehicle safety apparatus shown in FIG. 2 and FIGS. 3 (B) to (F) are schematic cross-sectional views of aerial vehicle safety apparatuses according to first to fifth modifications.

DESCRIPTION OF EMBODIMENTS

Embodiments of the present invention will be described in detail below with reference to the drawings. The embodiments and modifications thereof shown below illustrate application of the present invention to a drone representing an unmanned aircraft as an aerial vehicle.

First Embodiment

An aerial vehicle safety apparatus provided with a paraglider as an expandable object and an aerial vehicle including the same will initially be described as a first embodiment.

Figure 1:
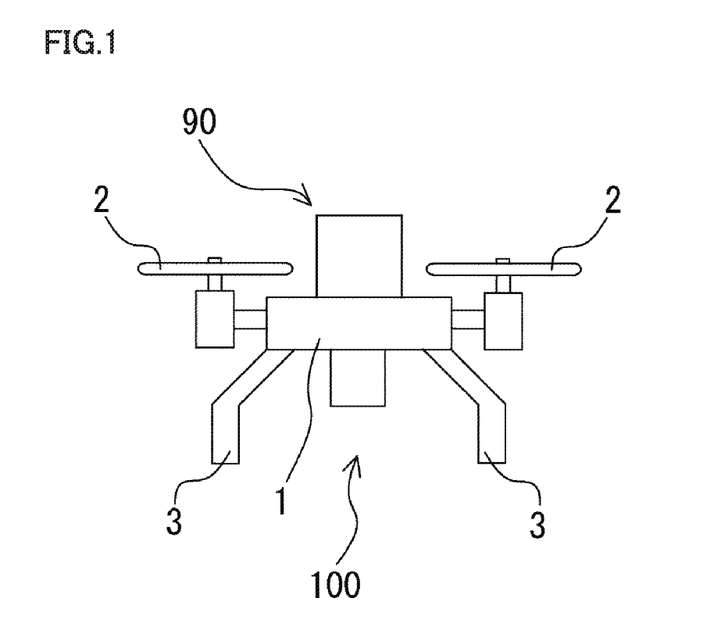
FIG. 1 is a schematic front view of an aerial vehicle including an aerial vehicle safety apparatus according to a first embodiment.

FIG. 1 is a schematic front view of an aerial vehicle 100 including an aerial vehicle safety apparatus 90 according to a First embodiment. As shown in FIG. 1, aerial vehicle 100 includes an airframe 1, at least one propulsive mechanism (for example, a propeller) 2 that is provided in airframe 1 and propels airframe 1, a plurality of legs 3 provided under airframe 1, and aerial vehicle safety apparatus 90 attached to airframe 1. Aerial vehicle safety apparatus 90 is provided on airframe 1.

Figure 2:
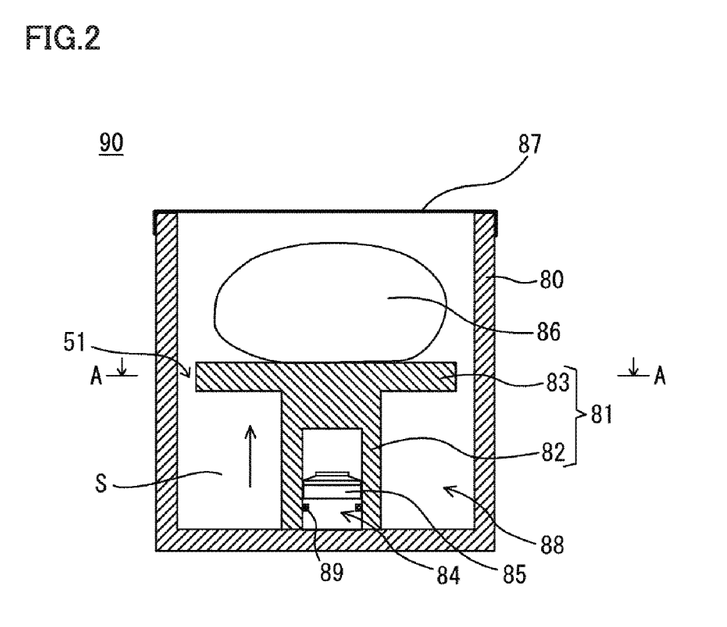
FIG. 2 is a schematic cross-sectional view of the aerial vehicle safety apparatus shown in FIG. 1.

FIG. 2 is a schematic cross-sectional view of aerial vehicle safety apparatus 90 shown in FIG. 1. As shown in FIG. 2, aerial vehicle safety apparatus 90 includes an actuator 88 as an ejection apparatus and a paraglider 86. Actuator 88 includes a gas generator (driver) 84 including a cup-shaped case 85 that accommodates an ignition agent (not shown), a piston 81 (a moving member) including a recess defining portion (recessed member) 82 and a piston head 83 (an emission base) formed integrally with recess defining portion 82, and a bottomed cylindrical housing 80 (a container) that accommodates piston 81 and restricts a direction of propulsion of piston 81.

Paraglider 86 is stored in housing 80 in a non-expanded state as being arranged on piston head 83. One end of a coupling member (a line or a cord) is coupled to paraglider 86 and the other end of the coupling member is coupled to any portion of actuator 88 or aerial vehicle 100.

Paraglider 86 is in a shape of a wing by being filled with air when it is ejected into air and expanded, and made, for example, of a reinforced cloth made of chemical fibers such as nylon or polyester. More specifically, for example, nylon 6, nylon 66, nylon 12, nylon 46, nylon 56, nylon 610, copolymerized polyamide of nylon 6 and nylon 66, copolymerized polyamide resulting from copolymerization of polyalkylene glycol, dicarboxylic acid, and amine with nylon 6, a polyester-based resin such as polyethylene terephthalate, polybutylene terephthalate, or polytrimethylene terephthalate, a polyacrylic resin, or a polyolefin-based resin such as polypropylene can be used for a fabric of paraglider 86. Among these, polyamide 66 excellent in resistance against impact and heat can particularly suitably be used for a fabric of paraglider 86.

For example, for providing high heat resistance, a coating layer may separately be provided on a fabric of paraglider 86. Various resins such as a silicone-based resin, a polyurethane-based resin, a polyacrylic resin, a polyamide-based resin, a polyester-based resin, a polyolefin-based resin, or a fluoric resin and various types of rubber such as silicone-based rubber, chloroprene-based rubber, or chlorosulfonated polyethylene-based rubber can be used for a coating layer to be provided, and the silicone-based resin is particularly preferably used. By using the silicone-based resin, not only heat resistance but also cold resistance, flame retardancy, and an air cut-off property can be enhanced. A dimethyl silicone resin, a methyl vinyl silicone resin, a methyl phenyl silicone resin, or a fluorosilicone resin is available as such a silicone-based resin. The coating layer preferably further contains a flame-retardant compound. Examples of such a flame retardant compound include a halogen compound containing bromine or chlorine (in particular, halogenated cycloalkane), a platinum compound, antimony oxide, copper oxide, titanium oxide, a phosphorus compound, a thiourea based compound, carbon, cerium, and silicon oxide, and in particular, a halogen compound, a platinum compound, copper oxide, titanium oxide, or carbon is more preferably used. An appropriate coating layer is preferably selected in accordance with a material for a yarn for making a fabric, and a material securely in intimate contact with warps and wefts is preferred. For example, when yarns are polyamide yarns or polyester yarns, the coating layer is preferably composed of a polyurethane-based resin or a polyacrylic resin.

Figure 3:
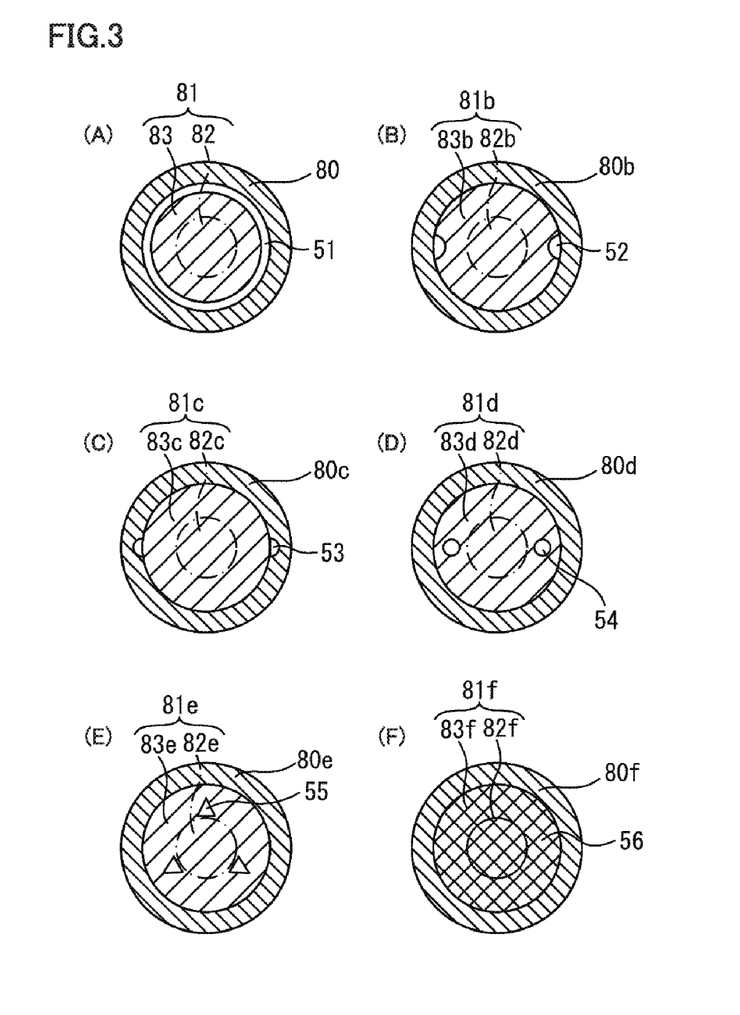

FIG. 3 (A) is a schematic cross-sectional view along the line A-A of aerial vehicle safety apparatus 90 shown in FIG. 2. As shown in FIGS. 2 and 3 (A), a communication portion 51 defined by a gap (clearance) is provided between the inner wall of housing 80 and an outer circumferential portion of piston head 83. When piston 81 is moved in a direction shown with an arrow in FIG. 2 by activation of gas generator 84, a negative pressure is generated in a space S located opposite to the opening in housing 80 when viewed from piston head 83 and surrounded by housing 80 and piston 81, however, air flows into space S through communication portion 51 from a space located outside space S and magnitude of the negative pressure generated at this time is made smaller. Thus, piston 81 can smoothly be moved.

Gas generator 84 is inserted in a recess provided in recess defining portion 82. A gas discharge opening is provided at a tip end of gas generator 84. Gas generator 84 can thus generate, as a result of ignition by an electrical signal, gas serving as thrust force for moving piston 81 in the recess in the direction shown with the arrow in FIG. 2. A sealing member 89 such as an O ring is provided between the recess provided in recess defining portion 82 and an outer wall portion of gas generator 84 for preventing leakage of gas at the time of activation.

Gas generator 84 contains an igniter containing an ignition agent (a propellant) and it is of an explosive type further including a gas generating agent or additionally a propellant such as an enhancer agent and a filter as necessary.

A non-azide-based gas generating agent is preferably employed as the gas generating agent, and the gas generating agent is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. As the additive, a binder, a slag formation agent, a combustion modifier, or the like is exemplified. As the binder, for example, metal salt of carboxymethyl cellulose and an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of. Single-base powder, double-base powder, or triple-base powder mainly composed of nitrocellulose may be employed.

A shape of a molding of the gas generating agent includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. A size of a molding or an amount thereof for filling is preferably selected as appropriate, in consideration of a linear burning velocity, a pressure exponent, or the like of the gas generating agent in addition to a shape of the gas generating agent.

In another modification of gas generator 84, a hybrid type or stored type gas generator in which a sealing plate in a small gas canister is cleaved by an explosive igniter to emit gas in the inside to the outside may be employed. In this case, incombustible gas such as argon, helium, nitrogen, or carbon dioxide or a mixture thereof can be employed as gas for increasing a pressure in the gas canister. In order to reliably propel piston 81 at the time of emission of pressure-increasing gas, a heat generator of an explosive type may be provided in the gas generator.

As piston 81 is propelled in such a construction, paraglider 86 can directly be pushed out and expanded. An opening end where the opening of housing 80 is provided is closed by a lid 87 in the initial state, and lid 87 is detached from the opening end as paraglider 86 is pushed out.

Piston 81 may directly be pushed out by gas generated by gas generator 84. Alternatively, a drive unit such as a spring, compressed gas, or a motor for driving piston 81 may separately be provided so that the piston is pushed out by activation of the drive unit by gas generated by gas generator 84. Piston 81 may telescopically be coupled to bottomed cylindrical housing 80 that restricts the direction of movement of piston 81.

Aerial vehicle safety apparatus 90 includes an abnormality detection apparatus 40 (see FIG. 4) including an acceleration sensor that detects an abnormal condition of aerial vehicle 100. When abnormality detection apparatus 40 detects an abnormal condition in such a construction, piston 81 is propelled by a gas pressure generated based on an ignition operation in gas generator 84. Paraglider 86 is thus directly pushed out by thrust force generated by propulsion of piston 81.

Figure 4:
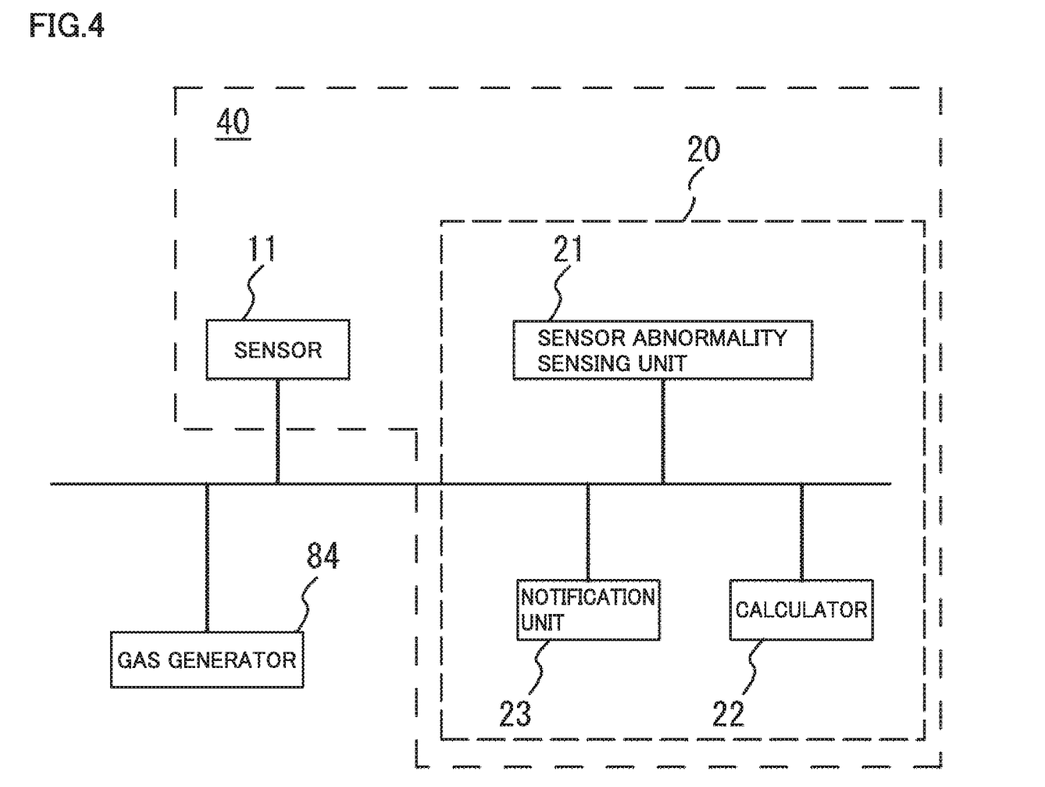
FIG. 4 is a functional block diagram of the aerial vehicle safety apparatus shown in FIG. 1.

FIG. 4 is a functional block diagram of aerial vehicle safety apparatus 90 shown in FIG. 1. A functional configuration of abnormality detection apparatus 40 will now be described. As shown in FIG. 4, abnormality detection apparatus 40 includes a sensor (sensing unit) 11 and a controller (a computer including a central processing unit (CPU), a read only memory (ROM), and a random access memory (RAM)) 20, and it is electrically connected to an igniter in gas generator 84 provided in aerial vehicle safety apparatus 90.

Sensor 11 senses a state of flight (including collision and crash) of aerial vehicle 100. Specifically, sensor 11 is implemented by at least one selected, for example, from among an acceleration sensor, a gyro sensor, a barometric pressure sensor, a laser sensor, and an ultrasonic sensor, and can obtain data on a state of flight of aerial vehicle 100 such as a speed, an acceleration, an inclination, an altitude, and a position of aerial vehicle 100.

Controller 20 includes a sensor abnormality sensing unit 21, a calculator 22, and a notification unit 23 as a functional configuration. Sensor abnormality sensing unit 21, calculator 22, and notification unit 23 are functionally implemented by execution of a prescribed program by controller 20.

Sensor abnormality sensing unit 21 senses an abnormal state of sensor 1. Sensor abnormality sensing unit 21 senses whether or not sensor 11 can normally operate.

Calculator 22 determines whether or not a state of flight of aerial vehicle 100 is abnormal based on data obtained by actual measurement by sensor 11. Specifically, calculator 22 determines whether or not aerial vehicle 100 has received impact (or makes determination as to collision) or makes determination as to prediction of crash of aerial vehicle 100. When calculator 22 determines that the state of flight of aerial vehicle 100 is abnormal, it outputs an abnormality signal (which may also include an instruction signal for starting up or activating other equipment) to the outside. An abnormality signal output unit may be provided separately from calculator 22, and the abnormality signal output unit may output an abnormality signal in response to an instruction from calculator 22.

When sensor abnormality sensing unit 21 senses an abnormal condition of sensor 11, notification unit 23 gives a manager a notification to the effect that the abnormal condition of sensor 11 has been sensed.

Operations by abnormality detection apparatus 40 in the present embodiment configured as described above will now be described.

Initially, sensor abnormality sensing unit 21 conducts an abnormality test of sensor 11. Specifically, sensor abnormality sensing unit 21 conducts a test as to whether or not an acceleration sensor that measures an acceleration of aerial vehicle 100 normally operates.

When it is determined that the sensor is abnormal as a result of the test, sensor abnormality sensing unit 21 gives an error notification to a manager and quits its operation. When it is determined that there is no abnormality as a result of the test, calculator 22 reads data actually obtained by sensor 11.

When calculator 22 determines that the data obtained by actual measurement by sensor 11 is not abnormal, it outputs a signal indicating return to processing for a test of an abnormal condition of sensor 11 by sensor abnormality sensing unit 21.

When the obtained data is abnormal, calculator 22 outputs a safety apparatus start-up signal (an abnormality signal) to gas generator 84 in aerial vehicle safety apparatus 90.

Gas generator 84 is started up by receiving the safety apparatus start-up signal and actuator 88 is thus driven. Paraglider 86 is thus ejected and expanded.

Thus, according to the present embodiment, magnitude of the negative pressure generated at the time of drive can be made smaller and cancellation of at least some of thrust force of piston 81 by the negative pressure can be suppressed. When piston head 83 and the inner wall of housing 80 are not in contact with each other, no friction resistance is produced in that portion. Therefore, in this regard as well, lowering in thrust force at the time of ejection of paraglider 86 can be suppressed.

Therefore, by adopting the construction, the expandable object can be ejected more reliably and ejection and expansion of the expandable object can be achieved more readily and accurately than in a conventional example.

Communication portion 51 in the construction allows flow-in of air along the outer circumference of piston head 83 into space S in a balanced manner at the time of ejection of piston 81. Therefore, a position of piston 81 while it is moved can also be held.

Since gas generator 84 that discharges gas by being activated in response to input of an electrical signal is employed as the driver, timing of drive can readily be controlled. In particular, when gas generator 84 is of an explosive type, thrust force for moving piston 81 can instantaneously be obtained.

By providing above-described sealing member 89 between the recess provided in recess defining portion 82 in piston 81 and the outer wall portion of gas generator 84, leakage of gas at the time of activation can be prevented and hence thrust force can more efficiently be obtained.

An aerial vehicle safety apparatus including a paraglider as the expandable object and an aerial vehicle including the same are illustrated and described in the present embodiment above. By providing a parachute instead of the paraglider, an aerial vehicle safety apparatus including a parachute as the expandable object and an aerial vehicle including the same can be provided, and an effect in conformity with the effect described above can be obtained also in that case.

(First to Fifth Modifications)

FIGS. 3 (B) to (F) are schematic cross-sectional views of aerial vehicle safety apparatuses according to first to fifth modifications. Though an example in which a gap provided between the inner wall of the housing and the outer circumferential portion of the piston head defines the communication portion is illustrated in the first embodiment, aerial vehicle safety apparatuses constructed, for example, as shown in FIGS. 3 (B) to (F) may be applicable. In FIGS. 3 (B) to (F), a component similar to that shown in FIG. 3 (A) is provided with an identical reference numeral with a suffix being added thereto. Therefore, for example, a component shown with a reference numeral 80 and a component shown with a reference numeral 80b are similar to each other.

The aerial vehicle safety apparatus according to the first modification shown in FIG. 3 (B) is different from aerial vehicle safety apparatus 90 according to the first embodiment in its construction that an inner diameter of a housing 80b is equal to an outer diameter of a piston head 83b and that a pair of communication portions 52 (notches) is provided in the outer circumferential portion of piston head 83b by cutting a part thereof.

Communication portion 52 functions similarly to communication portion 51 in the first embodiment and reduces magnitude of a negative pressure generated in space S (see FIG. 1) when a piston 81b is moved.

Communication portions 52 may be provided in rotation symmetry with respect to the center of piston head 83b or one communication portion or three or more communication portions may be provided at any position in the outer circumferential portion. When communication portions 52 are provided in rotation symmetry with respect to the center of piston head 83b, air can flow into space S in a balanced manner through evenly arranged communication portions 52 while piston 81b is moved, and a position of piston 81b while it is moved is readily held. Since friction resistance between piston head 83b and the inner wall of housing 80b can be lowered in a balanced manner, lowering in thrust force at the time of activation can also be prevented.

The aerial vehicle safety apparatus according to the second modification shown in FIG. 3 (C) is different from the aerial vehicle safety apparatus according to the first embodiment in its construction that an inner diameter of a housing 80c is equal to an outer diameter of a piston head 83c and that a pair of communication portions 53 (grooves) in a form of a pair of grooves provided along a direction of ejection of piston head 83c is provided in the inner wall of housing 80c.

Communication portion 53 functions similarly to communication portion 51 in the first embodiment and reduces magnitude of a negative pressure generated in space S (see FIG. 1) when a piston 81c is moved.

Communication portions 53 may be provided in rotation symmetry with respect to the center of piston head 83c or one communication portion or three or more communication portions may be provided at any position in the inner wall of housing 80c. When communication portions 53 are provided in rotation symmetry with respect to the center of piston head 83c, air can flow into space S in a balanced manner through evenly arranged communication portions 53 while piston 81c is moved, and a position of piston 81c while it is moved is readily held. Since friction resistance between piston head 83c and the inner wall of housing 80c can be lowered in a balanced manner, lowering in thrust force at the time of activation can also be prevented.

The aerial vehicle safety apparatus according to the third modification shown in FIG. 3 (D) is different from the aerial vehicle safety apparatus according to the first embodiment in its construction that an inner diameter of a housing 80d is equal to an outer diameter of a piston head 83d and that a pair of communication portions 54 (holes) in a form of a through hole is provided in piston head 83d. Communication portions 54 are provided to face a pair of spaces partitioned by piston head 83d (that is, a space located on a side of the opening of housing 80d when viewed from piston head 83d and a space located opposite to the opening of housing 80d when viewed from piston head 83d (that is, space S (see FIG. 1)).

Communication portion 54 functions similarly to communication portion 51 in the first embodiment and reduces magnitude of a negative pressure generated in space S while a piston 81d is moved.

Communication portions 54 may be provided in rotation symmetry with respect to the center of piston head 83d or one communication portion or three or more communication portions may be provided at any position in piston head 83d other than a position where there is communication with the recess provided in a recess defining portion 82d. When communication portions 54 are provided in rotation symmetry with respect to the center of piston head 83d, air can flow into space S in a balanced manner through evenly arranged communication portions 54 while piston 81d is moved, and a position of piston 81d while it is moved is readily held.

The aerial vehicle safety apparatus according to the fourth modification shown in FIG. 3 (E) is different from the aerial vehicle safety apparatus according to the first embodiment in its construction that an inner diameter of a housing 80e is equal to an outer diameter of a piston head 83e and that three communication portions 55 (holes) in a form of a through hole are provided in piston head 83e. Three communication portions 55 are provided at positions at 120° interval with respect to the center of piston head 83e, which is the only difference in construction of the aerial vehicle safety apparatus according to the present modification from the aerial vehicle safety apparatus according to the third modification described above.

The aerial vehicle safety apparatus according to the fifth modification shown in FIG. 3 (F) is different from the aerial vehicle safety apparatus according to the first embodiment in its construction that an inner diameter of a housing 80f is equal to an outer diameter of a piston head 83f and that piston head 83f is made of a meshed member where a plurality of communication portions 56 (holes) in a form of a through hole are provided. Communication portions 56 are provided to face a pair of spaces partitioned by piston head 83f (that is, a space located on the side of the opening of housing 80f when viewed from piston head 83f and a space located opposite to the opening of housing 80f when viewed from piston head 83f (that is, space S (see FIG. 1)). The meshed member encompasses not only a member like a mesh but also a member in a form of grids.

Communication portion 56 functions similarly to communication portion 51 in the first embodiment and reduces magnitude of a negative pressure generated in space S while a piston 81f is moved.

When piston 81f is made of a meshed member, a plurality of communication portions 56 are provided evenly in piston head 83f. Therefore, air can flow into space S in a balanced manner through the plurality of communication portions 56 while piston 81f is moved, and a position of piston 81f while it is moved is readily held.

(Sixth Modification)

Figure 5:
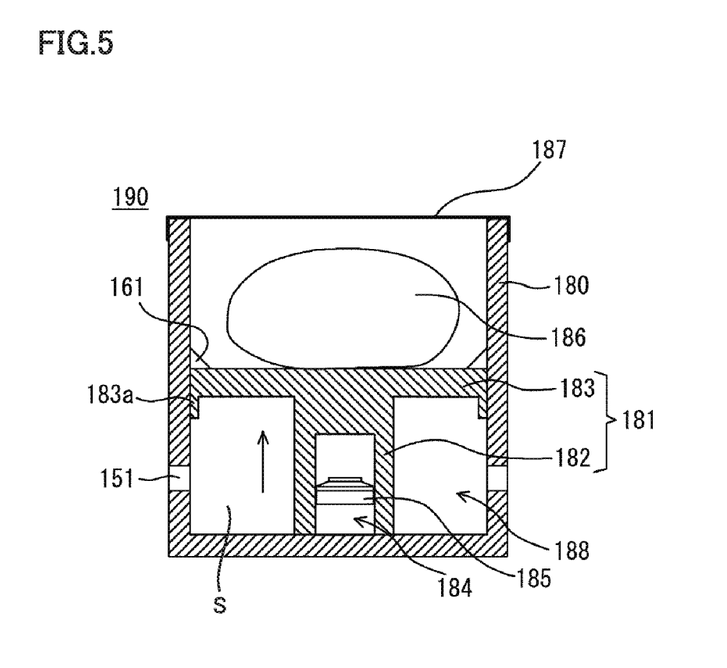
FIG. 5 is a schematic cross-sectional view of an aerial vehicle safety apparatus according to a sixth modification.

FIG. 5 is a schematic cross-sectional view of an aerial vehicle safety apparatus 190 according to a sixth modification. Though an example in which a communication portion is defined by a gap or a hole by providing a gap between the inner wall of the housing and the outer circumferential portion of the piston head or providing a hole in the piston head is illustrated in the first embodiment and the first to fifth modifications, aerial vehicle safety apparatus 190 constructed, for example, as shown in FIG. 5 may be applicable. Since features in FIG. 5 identical in reference numerals in last two digits to the features shown in FIG. 2 are basically the same as those described with reference to FIG. 2, description thereof may not be provided.

Aerial vehicle safety apparatus 190 according to the sixth modification shown in FIG. 5 is different from aerial vehicle safety apparatus 90 according to the first embodiment in its construction that a pair of communication portions 151 is provided in a side portion of a housing 180, a pair of protrusions 161 (stoppers) is formed on the inner wall of housing 180, and a ring-shaped guide 183a is formed in an outer circumferential portion of a piston head 183.

Communication portion 151 functions similarly to communication portion 51 in the first embodiment and reduces magnitude of a negative pressure generated in space S while a piston 181 is moved.

Communication portions 151 may be provided in rotation symmetry with respect to the center of housing 180 or one communication portion or three or more communication portions may be provided at any position in the side portion of housing 180. When communication portions 52 are provided in rotation symmetry with respect to the center of housing 180, air can flow into space S in a balanced manner through evenly arranged communication portions 151 while piston 181 is moved, and a position of piston 181 while it is moved is readily held.

Protrusion 161 abuts on piston head 183 before activation to thereby prevent movement of piston head 183 (piston 181) before activation, and it is provided to protrude from an inner wall surface of housing 180 into the space in housing 180. At the time of activation, piston head 183 is moved beyond protrusion 161 by strong thrust force generated by activation of gas generator 184 to move piston 181.

Protrusions 161 may be provided in rotation symmetry with respect to the center of housing 180 or one protrusion or three or more protrusions may be provided at any position in the side portion of housing 180. Protrusion 161 may be formed in a ring shape around the entire inner circumferential portion of housing 180.

Guide 183a guides movement of piston 181 along the inner wall of housing 180 and it is implemented by a portion in a form of a ring and a protrusion provided to protrude from the outer circumferential portion of piston head 183 along the inner wall of housing 180. Preferably, a thickness of guide 183a in a direction along the inner wall of housing 180 is larger than a thickness of piston head 183 in that direction. By providing guide 183a, a slide contact surface between housing 180 and piston 181 is larger so that a position of piston 181 while it is moved is readily held.

Protrusion 161 may be provided independently at one location in the outer circumferential portion of piston head 183 or protrusions 161 may be provided at a plurality of locations at intervals, in rotation symmetry with respect to the center of piston head 183.

With aerial vehicle safety apparatus 190 according to the construction, in addition to the effect similar to that of aerial vehicle safety apparatus 90 in the first embodiment, movement of piston head 183 (piston 181) before activation can be prevented by providing protrusion 161. Therefore, an effect that attachment of the aerial vehicle safety apparatus to the aerial vehicle does not interfere autonomous control of the aerial vehicle is obtained.

With aerial vehicle safety apparatus 190 according to the construction, piston head 183 (piston 181) is more readily moved along the inner wall of housing 180 by providing guide 183a. Therefore, an effect that piston head 183 (piston 181) is smoothly moved is also obtained.

(Seventh Modification)

Figure 6:
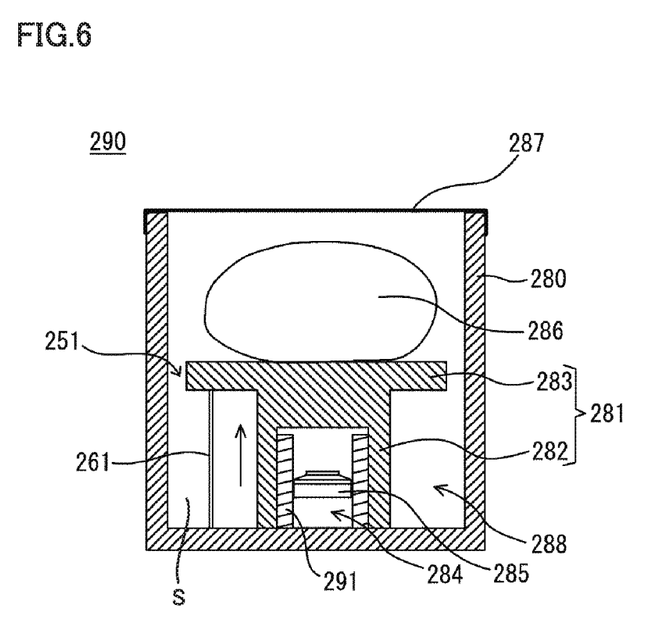
FIG. 6 is a schematic cross-sectional view of an aerial vehicle safety apparatus according to a seventh modification.

FIG. 6 is a schematic cross-sectional view of an aerial vehicle safety apparatus 290 according to a seventh modification. In addition to the aerial vehicle safety apparatuses in the first embodiment and the first to sixth modifications, for example, aerial vehicle safety apparatus 290 constructed, for example, as shown in FIG. 6 may be applicable. Since features in FIG. 6 identical in reference numerals in last two digits to the features shown in FIG. 2 are basically the same as those described with reference to FIG. 2, description thereof may not be provided.

Aerial vehicle safety apparatus 290 according to the seventh modification shown in FIG. 6 is different from aerial vehicle safety apparatus 90 according to the first embodiment in its construction that a string member 261 that couples the inner wall of a housing 280 and a piston head 283 to each other is provided and that a restriction member 291 is provided around a gas generator 284.

String member 261 is provided to connect piston head 283 before activation and the inner wall of housing 280 to each other so as to prevent movement of piston head 283 (piston 281) before activation. At the time of activation, piston 281 is moved by strong thrust force generated by activation of gas generator 284. Then, tension is generated in string member 261 and string member 261 is thus cut.

A not-shown cutting apparatus may separately be provided and the cutting apparatus may cut string member 261 simultaneously with activation of gas generator 284. In this case, the cutting apparatus may cut string member 261 by driving a motor that moves a knife or the like by receiving an electrical signal, or may burn out the string member by generating heat. Instead of the cutting apparatus, a mechanism that releases, at the time of activation, one end of string member 261 held thereby in advance may be employed.

Restriction member 291 restricts a direction of discharge of gas discharged from gas generator 284 by being positioned to surround gas generator 284. More specifically, restriction member 291 allows discharge of gas to piston 281 by matching a direction of discharge of gas discharged from a gas discharge opening at a tip end of gas generator 284 to a direction of movement (a direction shown with an arrow in FIG. 6) of piston 281 toward the opening in housing 280.

Restriction member 291 is preferably made of a cylindrical member such that gas generator 284 can be inserted therein, and in that case, a recess defining portion 282 of piston 281 is preferably cylindrical such that piston 281 can externally be attached to restriction member 291.

With aerial vehicle safety apparatus 290 according to the construction, in addition to the effect similar to that of aerial vehicle safety apparatus 90 in the first embodiment, movement of piston head 283 (piston 281) before activation can be prevented by providing string member 261. Therefore, attachment of the aerial vehicle safety apparatus to the aerial vehicle can be prevented from interfering autonomous control of the aerial vehicle.

With aerial vehicle safety apparatus 290 according to the construction, directions of discharge of gas can be concentrated to a prescribed direction by providing restriction member 291. Therefore, thrust force can more efficiently be obtained. Since piston head 283 (piston 281) is moved along the outer wall of restriction member 291 by providing restriction member 291, piston head 283 (piston 281) can smoothly be moved.

Second Embodiment

An aerial vehicle safety apparatus including a paraglider and an air bag as objects to be expanded and an aerial vehicle including the same will now be described as a second embodiment.

Figure 7:
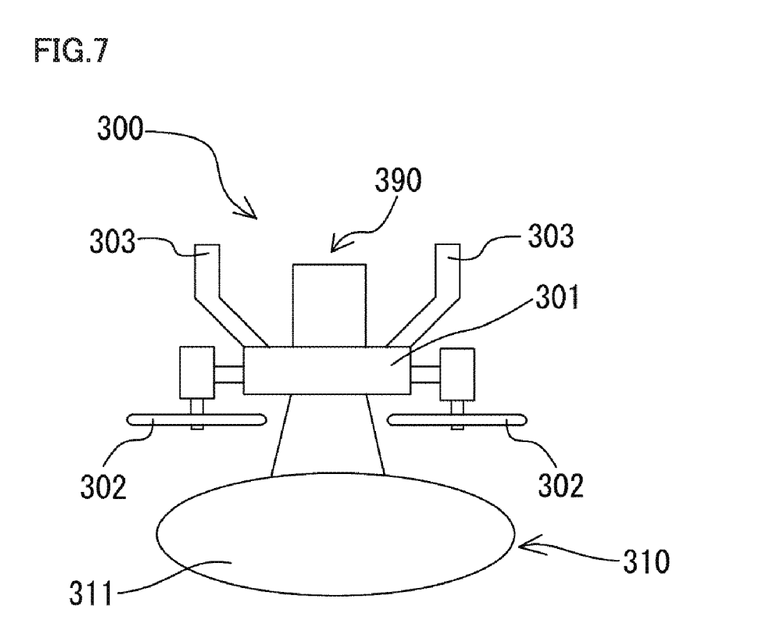
FIG. 7 is a schematic front view showing a state of an aerial vehicle including an aerial vehicle safety apparatus according to a second embodiment after an air bag is expanded.

FIG. 7 is a schematic front view showing a state of an aerial vehicle 300 including an aerial vehicle safety apparatus 390 according to the second embodiment after an air bag 311 is expanded. Since features in FIG. 7 identical in reference numerals in last one digit to the features shown in FIG. 1 are basically the same as those described with reference to FIG. 1, description thereof may not be provided.

As shown in FIG. 7, unlike aerial vehicle safety apparatus 90 according to the first embodiment, aerial vehicle safety apparatus 390 according to the present embodiment has a main body provided under an airframe 301 of aerial vehicle 300 in a normal position and an air bag apparatus 310 which is a part of aerial vehicle safety apparatus 390 is further provided above airframe 301 in the normal position so as to be opposed to the main body of aerial vehicle safety apparatus 390 provided under airframe 301 in the normal position with airframe 301 being interposed.

Air bag apparatus 310 includes air bag 311 and a gas generator and inflates air bag 311 by a gas pressure generated based on an ignition operation by the gas generator. Any gas generator is applicable so long as it is capable of supplying gas into the air bag and it may be of an explosive type including an igniter or of a canister type instead.

The main body of aerial vehicle safety apparatus 390 is similar to that of aerial vehicle safety apparatus 90 according to the embodiment and constructed to be able to eject a paraglider.

According to such a construction, when an abnormality detection apparatus mounted on air bag apparatus 310 determines a state of flight of aerial vehicle 300 as being abnormal based on data obtained by actual measurement by a sensor (not shown), a safety apparatus start-up signal is output from the abnormality detection apparatus configured similarly to abnormality detection apparatus 40 described above to the gas generator of air bag apparatus 310 to thereby activate the gas generator.

As the gas generator is activated, air bag 311 is ejected by the gas pressure generated by the gas generator and inflated. In the event of falling of aerial vehicle 300, an obstacle and a mounted object and in particular a pedestrian can thus be protected.

When the abnormality detection apparatus mounted on air bag apparatus 310 determines the state of flight of aerial vehicle 300 as not being abnormal based on data obtained by actual measurement by the sensor (not shown), the abnormality detection apparatus does not output the safety apparatus start-up signal to the gas generator.

Thus, when an abnormality detection apparatus is provided in air bag apparatus 310, an erroneous operation of air bag apparatus 310 can more reliably be prevented. Therefore, reliability in an aspect of safety of air bag apparatus 310 can be improved. Other functions and effects are the same as in aerial vehicle safety apparatus 90 described above.

Third Embodiment

An aerial vehicle safety apparatus including a paraglider and an air bag as objects to be expanded and an aerial vehicle including the same will now be described as a third embodiment.

Figure 8:
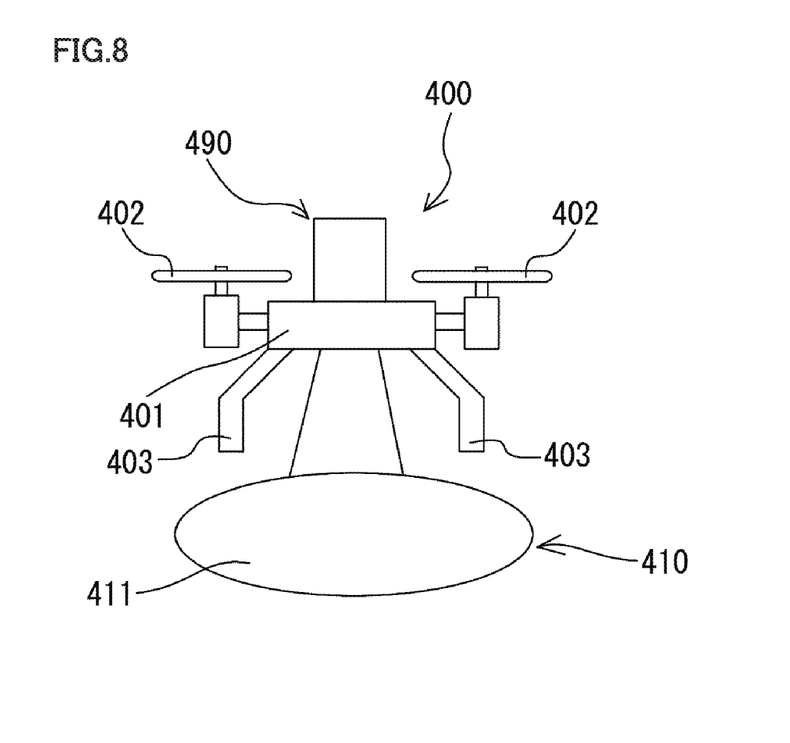
FIG. 8 is a schematic front view showing a state of an aerial vehicle including an aerial vehicle safety apparatus according to a third embodiment after an air bag is expanded.

FIG. 8 is a schematic front view showing a state of an aerial vehicle 400 including an aerial vehicle safety apparatus 490 according to the third embodiment after an air bag 411 is expanded. Since features in FIG. 8 identical in reference numerals in last one digit to the features shown in FIG. 1 are basically the same as those described with reference to FIG. 1, description thereof may not be provided.

As shown in FIG. 8, unlike aerial vehicle safety apparatus 90 according to the first embodiment, aerial vehicle safety apparatus 490 according to the present embodiment has an air bag apparatus 410 which is a part of aerial vehicle safety apparatus 490 provided under an airframe 401 in a normal position as being opposed to a main body of aerial vehicle safety apparatus 490 provided on airframe 401 of aerial vehicle 400 in the normal position, with airframe 401 being interposed.

Air bag apparatus 410 includes air bag 411 and a gas generator and inflates air bag 411 by a gas pressure generated based on an ignition operation by the gas generator. Any gas generator is applicable so long as it is capable of supplying gas into the air bag and it may be of an explosive type including an igniter or of a canister type instead.

The main body of aerial vehicle safety apparatus 490 is similar to that of aerial vehicle safety apparatus 90 according to the embodiment and constructed to be able to eject a paraglider.

According to such a construction, when an abnormality detection apparatus mounted on air bag apparatus 410 determines a state of flight of aerial vehicle 400 as being abnormal based on data obtained by actual measurement by a sensor (not shown), a safety apparatus start-up signal is output from the abnormality detection apparatus configured similarly to abnormality detection apparatus 40 described above to the gas generator of air bag apparatus 410 to thereby activate the gas generator.

As the gas generator is activated, air bag 411 is ejected by the gas pressure generated by the gas generator and inflated. In the event of falling of aerial vehicle 400, an obstacle and a mounted object and in particular a pedestrian can thus be protected. In the present embodiment, various devices often provided under airframe 401 can also be protected by air bag 411.

When the abnormality detection apparatus mounted on air bag apparatus 410 determines the state of flight of aerial vehicle 400 as not being abnormal based on data obtained by actual measurement by the sensor (not shown), the abnormality detection apparatus does not output the safety apparatus start-up signal to the gas generator.

Thus, when an abnormality detection apparatus is provided in air bag apparatus 410, an erroneous operation of air bag apparatus 410 can more reliably be prevented. Therefore, reliability in an aspect of safety of air bag apparatus 410 can be improved. Other functions and effects are the same as in aerial vehicle safety apparatus 90 described above.

(Other Modifications)

Though an example in which the sensor abnormality sensing unit, the calculator, and the notification unit are functionally implemented by software is illustrated in the embodiments and the modifications thereof described above, limitation thereto is not intended and they may be implemented by hardware.

A cross-sectional shape of the communication portion in the embodiments and the modifications thereof described above is not particularly restricted and any shape is applicable.

Though an example in which an explosive type gas generator is mainly employed as the gas generator is illustrated in the embodiments and the modifications thereof described above, a gas generator of a non-explosive type such as a canister type may be employed. A micro gas generator (MGG) or a squib structured such that a gas discharge opening is provided by increase in internal pressure by gas generated at the time of activation may be employed instead of the gas generator described above as the gas generator of another explosive type different from the explosive type gas generator described above.

Characteristic features shown in the embodiments and the modifications thereof described above can be combined with one another.

(Summary of First to Third Embodiments, First to Seventh Modifications, and Other Modifications Described Above)

Characteristic features in the disclosure in the first to third embodiments and the first to seventh modifications described above and other modifications described above are summarized as below by paragraphs.

(1) The present invention is directed to an expansion apparatus for expanding a parachute, a paraglider, or an air bag mounted on an aerial vehicle, and the expansion apparatus includes a container having an opening on a one end side, the parachute, the paraglider, or the air bag that can be expanded, a moving member provided in the container, the moving member including an emission base carrying the parachute, the paraglider, or the air bag on a side of the opening, the moving member being movable along an inner wall of the container, a driver that ejects the moving member toward the opening, and a coupling member having one end coupled to the parachute, the paraglider, or the air bag and the other end coupled to the aerial vehicle or an apparatus affixed to the aerial vehicle. A communication portion that allows communication between a space surrounded by the container and the moving member and the outside of the space is provided in at least one of the container, the emission base, and between the inner wall of the container and the emission base.

According to the construction in (1), a negative pressure at the time of drive can be made smaller and cancellation of at least some of thrust force by the negative pressure can be suppressed. In other words, lowering in thrust force at the time of ejection of the parachute, the paraglider, or the air bag can be suppressed. Therefore, the parachute, the paraglider, or the air bag can be ejected and expanded more readily and accurately than in a conventional example.

(2) In the expansion apparatus in (1), the communication portion is preferably defined by at least one of a hole provided in the container, a hole provided in the emission base, and a gap provided between the inner wall of the container and the emission base. The "gap provided between the inner wall of the container and the emission base" includes, for example, not only a mere gap but also a groove provided in the inner wall of the container along the direction of ejection of the parachute, the paraglider, or the air bag or a notch provided by cutting an outer circumferential portion of the emission base in a radial direction.

According to the construction in (2), the negative pressure at the time of drive can more reliably be made smaller.

(3) In the expansion apparatus in (1) or (2), the container and/or the emission base are/is preferably provided with a stopper that prevents movement of the emission base before activation of the driver.

According to the construction in (3), movement of the emission base before activation can be prevented. Therefore, attachment of the expansion apparatus according to the present invention to the aerial vehicle does not interfere autonomous control of the aerial vehicle.

(4) In the expansion apparatus in (1) to (3), the stopper preferably includes a protrusion provided to protrude from the inner wall of the container.

According to the construction in (4), attachment of the expansion apparatus according to the present invention to the aerial vehicle can more reliably be prevented from interfering autonomous control of the aerial vehicle.

(5) In the expansion apparatus in (1) to (4), the stopper preferably includes a string member that couples the inner wall of the container and the emission base to each other, and the string member is cut by tension or a cutting apparatus at the time of drive by the driver.

According to the construction in (5), movement of the emission base before activation can be prevented. Therefore, attachment to the aerial vehicle can be prevented from interfering autonomous control of the aerial vehicle.

(6) In the expansion apparatus in (1) to (5), a guide member larger in length dimension than a thickness dimension of the emission base is preferably provided to protrude from the outer circumferential portion of the emission base along the inner wall of the container. An annular guide member, a member including a part such as at least one member like a protrusion, or a member including a plurality of components at intervals may be applicable.

According to the construction in (6), the emission base (moving member) is readily moved along the inner wall of the container. Therefore, the emission base (moving member) can smoothly be moved.

(7) In the expansion apparatus in (1) to (6), the driver preferably includes a gas generator that generates gas by being activated by an electrical signal.

According to the construction in (7), timing of drive by the driver can readily be controlled.

(8) In the expansion apparatus in (7), the gas generator is preferably of an explosive type containing a propellant that generates combustion gas serving as thrust force that moves the moving member.

According to the construction in (8), thrust force that moves the moving member can instantaneously be obtained.

(9) In the expansion apparatus in (7) or (8), preferably, the gas generator is structured such that it has gas discharge openings on the side of the opening or gas discharge openings are formed by increase in internal pressure by gas generated at the time of activation, and a restriction member that restricts flow paths of gas discharged through the gas discharge openings in a direction toward the opening is provided around the gas generator.

According to the construction in (9), directions of discharge of gas can be concentrated to a prescribed direction. Therefore, thrust force can more efficiently be obtained.

(10) In the expansion apparatus in (7) to (9), preferably, the moving member further includes a recessed member having a bottom coupled to the emission base, the gas generator includes gas discharge openings on the side of the opening, the gas generator is inserted in the recessed member such that at least the gas discharge openings are located in the recessed member, and a sealing member is provided between the recessed member and the gas generator.

According to the construction in (10), leakage of gas generated by the gas generator can be prevented and hence thrust three can more efficiently be obtained.

(11) An aerial vehicle according to the present invention includes an airframe, the expansion apparatus for expanding a parachute, a paraglider, or an air bag described in (1) to (10) coupled to the airframe, and at least one propulsive mechanism that is coupled to the airframe and propels the airframe.

According to the construction in (11), an aerial vehicle capable of achieving a function and effect of the expansion apparatus for expanding a parachute, a paraglider, or an air bag in (1) to (10) can be provided.

The embodiments and the modifications thereof disclosed herein are illustrative and non-restrictive in every respect. The technical scope of the present invention is delimited by the terms of the claims and includes any modifications within the scope and meaning equivalent to the terms of the claims.

REFERENCE SIGNS LIST 1 airframe; 2 propulsive mechanism; 3 leg; 11 sensor; 20 controller; 21 sensor abnormality sensing unit; 22 calculator; 23 notification unit; 40 abnormality detection apparatus; 51 to 56 communication portion; 80, 80b to 80f housing; 81, 81b to 81f piston; 82, 82b to 82f recess defining portion; 83, 83b to 83f piston head; 84 gas generator; 85 case; 86 paraglider; 87 lid; 88 actuator; 89 sealing member; 90 aerial vehicle safety apparatus; 100 aerial vehicle; 151 communication portion; 161 protrusion; 180 housing; 181 piston; 182 recess defining portion; 183 piston head; 183a guide; 184 gas generator; 185 case; 186 paraglider; 187 lid; 188 actuator; 190 aerial vehicle safety apparatus; 251 communication portion; 261 string member; 280 housing; 281 piston; 282 recess defining portion; 283 piston head; 284 gas generator; 285 case; 286 paraglider; 287 lid; 288 actuator; 290 aerial vehicle safety apparatus; 291 restriction member; 300 aerial vehicle; 301 airframe; 302 propulsive mechanism; 303 leg; 310 air hag apparatus; 311 air bag; 390 aerial vehicle safety apparatus; 400 aerial vehicle; 401 airframe; 402 propulsive mechanism; 403 leg; 410 air bag apparatus; 411 air bag; 490 aerial vehicle safety apparatus; S space

The invention claimed is:

1. An aerial vehicle safety apparatus attachable to an aerial vehicle comprising:
   an expandable object that can be expanded as being ejected into air;
   an ejection apparatus that ejects the expandable object into air;
   the ejection apparatus including
      a container accommodating the expandable object and having an opening provided on a one end side,
      a moving member provided in the container, the moving member including an emission base carrying the expandable object on a side of the opening, the moving member being movable along an inner wall of the container, and
      a driver that ejects the expandable object by moving the moving member toward the opening, and
   the ejection apparatus being provided with a communication portion that allows communication between a first space and a second space, the first space being located at a first side of the communication portion opposite to the opening when viewed from the emission base and surrounded by the container and the moving member, and the second space being located outside the first space at a second side of the communication portion,
   wherein the driver includes a gas generator that discharges gas by being activated in response to input of an electrical signal,
   wherein the moving member includes a recess defining portion that defines a recess that opens toward a side opposite to the opening,
   wherein the gas generator is inserted in the recess defining portion as being arranged in the recess, and
   wherein a sealing member is provided between the recess defining portion and the gas generator.

2. The aerial vehicle safety apparatus according to claim 1, wherein
   the ejection apparatus further includes a stopper that prevents the emission base from moving before the driver is activated.

3. The aerial vehicle safety apparatus according to claim 2, wherein
   the stopper includes a protrusion provided on the inner wall of the container.

4. The aerial vehicle safety apparatus according to claim 2, wherein
   the stopper includes a string member that connects the inner wall of the container and the emission base to each other, and
   the string member is cut as the driver drives the moving member.

5. The aerial vehicle safety apparatus according to claim 1, wherein
   the ejection apparatus further includes a guide that guides movement of the moving member along the inner wall of the container, and
   the guide includes a protrusion that protrudes from an outer circumferential portion of the emission base along the inner wall of the container.

6. The aerial vehicle safety apparatus according to claim 1, wherein
   the ejection apparatus further includes a restriction member that restricts a direction of discharge of gas discharged from the gas generator, by being positioned to surround the gas generator, and
   the restriction member allows discharge of gas to the moving member by matching the direction of discharge of gas to a direction of movement of the moving member toward the opening.

7. An aerial vehicle comprising:
   an airframe;
   a propulsive mechanism provided on the airframe, the propulsive mechanism propelling the airframe; and
   the aerial vehicle safety apparatus according to claim 1, the aerial vehicle safety apparatus being attached to the airframe.

* * * * *